March 14, 1950
R. C. SANDERS, JR., ET AL
CALIBRATING APPARATUS FOR FREQUENCY
MODULATED RADIO ALTIMETERS
2,500,325
Filed May 17, 1947
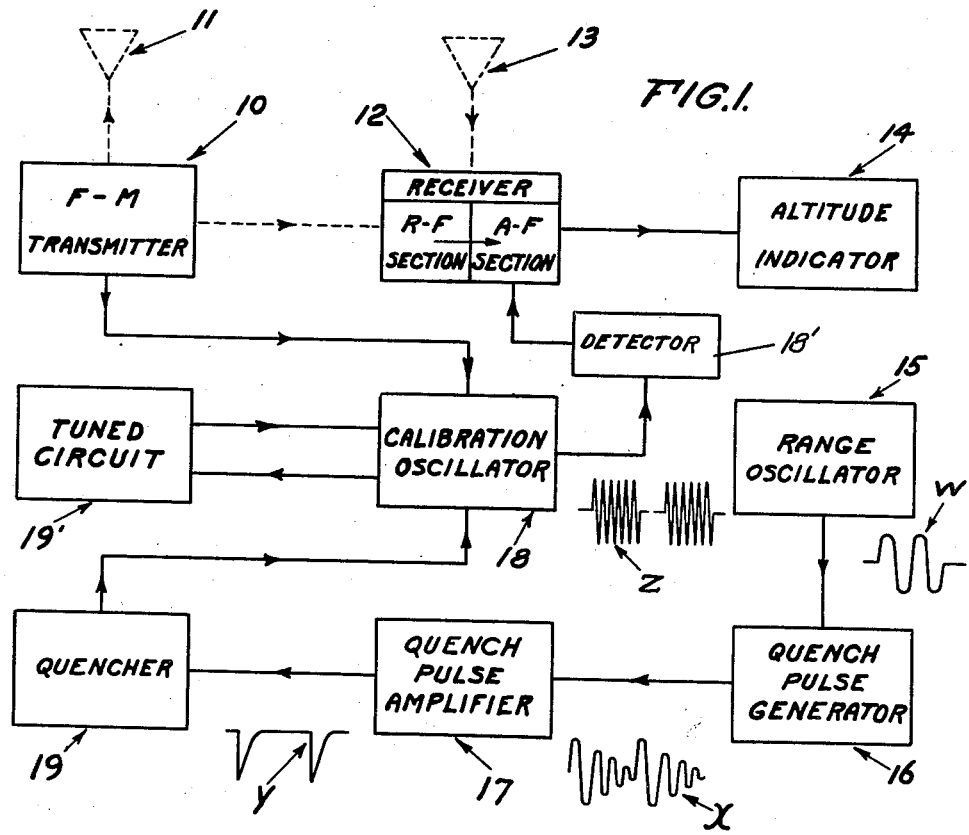
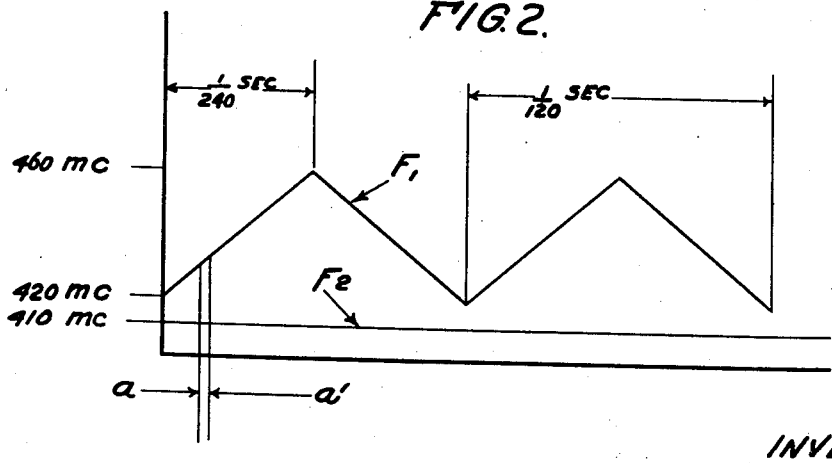
INVENTORS
ROYDEN C. SANDERS JR.
WILLIAM R. MERCER
BY Elmer J. Gorn
ATTY.

March 14, 1950
R. C. SANDERS, JR., ET AL
CALIBRATING APPARATUS FOR FREQUENCY
MODULATED RADIO ALTIMETERS
2,500,325
Filed May 17, 1947
3 Sheets-Sheet 2
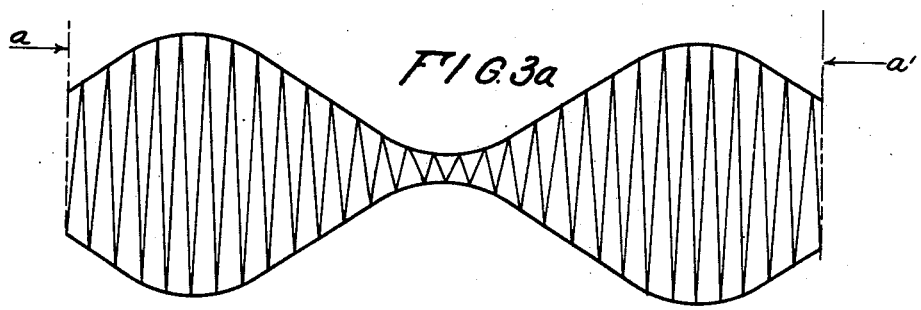
FIG.3a.
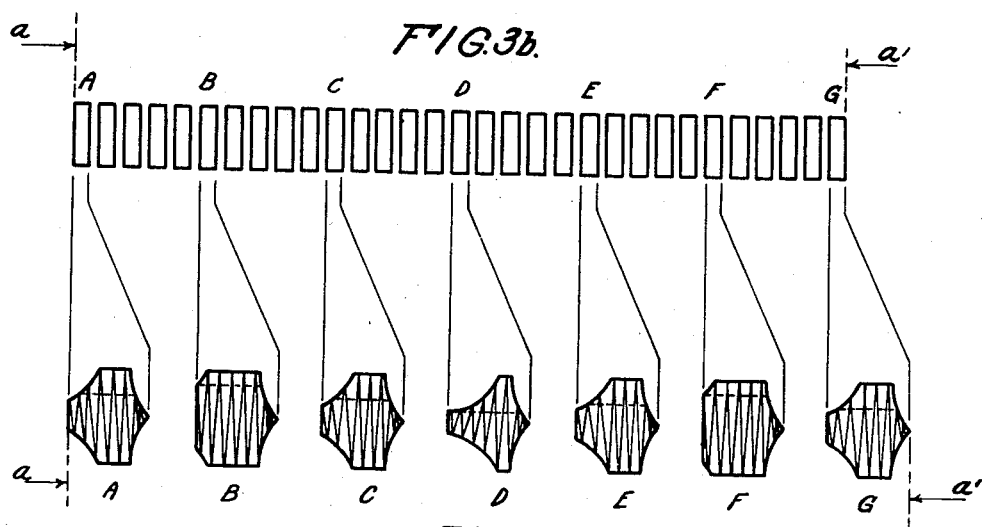
FIG.3b.
FIG.3c.
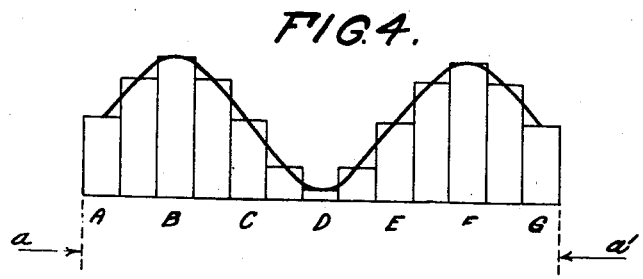
FIG.4.
INVENTORS
ROYDEN C. SANDERS JR.
WILLIAM R. MERCER
BY
ATTY.

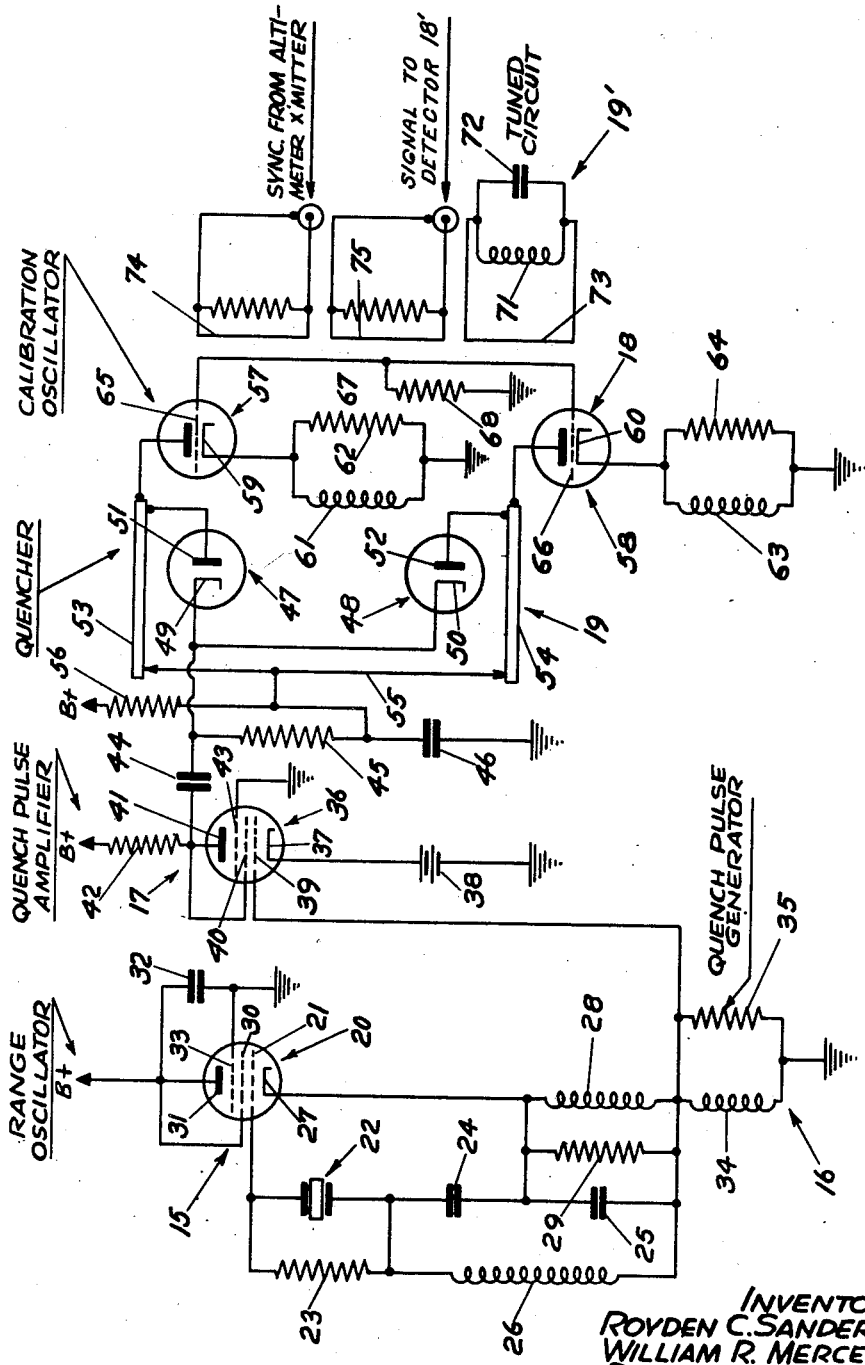

Patented Mar. 14, 1950

2,500,325

UNITED STATES PATENT OFFICE 2,500,325

CALIBRATING APPARATUS FOR FREQUENCY-MODULATED RADIO ALTIMETERS

Royden C. Sanders, Jr., Lexington, and William R. Mercer, Belmont, Mass., assignors to Raytheon Manufacturing Company, Newton, Mass., a corporation of Delaware Application May 17, 1947, Serial No. 748,812

4 Claims. (Cl. 343—14)

This invention relates to signal generators, and more particularly, to signal generators suitable for use in calibrating radio altimeters of the frequency-modulated type, and constitutes a continuation-in-part of the copending application entitled Calibrator, Serial No. 611,660, filed August 20, 1945.

Such altimeters generally determine absolute altitude as a function of the total time required for a radio signal generated in an aircraft to travel to and from the earth.

In the F.-M. type to which reference has been made, the frequency of a C.-W. transmitter is recurrently swept through an appropriate frequency band at a relatively low, audio-frequency rate, and the resulting F.-M. signal is beamed toward the earth. Upon reaching the earth, a portion of the energy of said signal is reflected thereby, and, eventually, the reflected signal is received back at the aircraft, where it is heterodyned with the signal instantaneously being transmitted. Now, during the time required for the originally transmitted signal to travel to the earth and return, the frequency of the altimeter transmitter changes by a small percentage of the bandwidth thereof, and therefore, the mixing of the reflected signal and the signal instantaneously being transmitted results in a beat note whose frequency is a function of said travel time. Said beat note is applied to a suitable indicator, usually, of the cycle-counting type, whose meter scale is graduated directly in terms of altitude.

Obviously, such an altimeter indicator requires calibration, and this is most conveniently accomplished by applying thereto a synthetic signal simulating that produced by an actual signal returning from the earth to a given altitude.

Devices heretofore employed to generate such a synthetic signal have not been sufficiently accurate, and it is, therefore, the main object of the present invention to overcome this difficulty and provide a signal generator which is extremely accurate and reliable.

This, and other objects of the present invention, which will become more apparent as the detailed description thereof progresses, are attained, briefly, in the following manner:

There is provided a radio-frequency generator, hereinafter referred to as the calibration oscillator, which is adapted to generate electrical oscillations of a frequency, preferably, outside of the band swept by the F.-M. transmitter of the altimeter to be calibrated, for example, a few megacycles below the lower limit of the altimeter transmitter band.

The calibration oscillator is quench-modulated by another, very stable oscillator, hereinafter referred to as the range oscillator, the latter being adapted to generate electrical oscillations, preferably, of a frequency whose period is approximately equal to the time-equivalent of a predetermined altitude at which it is desired to calibrate the altimeter. The resulting alternate free-running and quench periods of the calibration oscillator are thus precisely controlled as to time duration.

The output of the calibration oscillator is applied to an oscillatory circuit which is resonant to the frequency of said calibration oscillator and which is adapted to oscillate during both the free-running and the quench periods thereof. The coupling between the calibration oscillator and said oscillatory circuit is such that the output of the latter is, in turn, fed back to the former. A small amount of the output of the altimeter transmitter is also coupled to the calibration oscillator, said output and that of said oscillatory circuit combining to produce a resultant wave whose instantaneous magnitude is a function of the respective instantaneous phases of the calibration oscillator and oscillatory circuit outputs. By this means, the speed with which the oscillations generated by the calibration oscillator build up is controlled by the magnitude of the resultant wave applied thereto at the commencement of each free-running period. It follows that each train of oscillations generated by said calibration oscillator varies in average amplitude as a function of the magnitude of said resultant wave at the commencement of each free-running period.

This variation in average amplitude is recovered, in the form of an average voltage varying in magnitude at a frequency corresponding to that obtained during normal system operation at the above referred to predetermined distance, by demodulating the calibration oscillator output and applying the same to the audio-frequency section of the system receiver, said varying voltage then being applied to the altimeter indicator whose meter deflection will, accordingly, correspond to said predetermined distance.

In the accompanying specification there shall be described, and in the annexed drawings shown, an illustrative embodiment of the signal generator of the present invention. It is, however, to be clearly understood that the present invention is not to be limited to the details herein shown and described for purposes of illustration only, inasmuch as changes therein may be made without the exercise of invention and within the true spirit and scope of the claims hereto appended.

In said drawings, Fig. 1 is a block diagram of a frequency-modulated radio altimeter and a calibration-signal generator therefor, assembled in accordance with the principles of the present invention;

Fig. 2 is a graph showing the variation with time of the altimeter transmitter frequency, as compared with the fixed frequency of the calibration oscillator;

Fig. 3a shows a resultant wave produced by combining the above-mentioned calibration oscillator and oscillatory circuit outputs;

Fig. 3b shows a number of oscillation envelopes developed during a succession of the free-running periods of the calibration oscillator;

Fig. 3c shows a number of said oscillation envelopes in expanded form and the development of a varying average voltage from said oscillation envelopes;

Fig. 4 shows the development of an audio-frequency signal from said varying average voltage; and Fig. 5 is a circuit diagram of the signal generator of the present invention.

Referring now more in detail to the aforesaid illustrative embodiment of the present invention, and with particular reference to the block diagram shown in Fig. 1 of the drawings, the numeral 10 designates an altimeter transmitter. Such a transmitter may comprise an R. F. generator adapted to be frequency-modulated, for example, over a band extending from 420 mc. to 460 mc., at a recurrence rate of 120 C. P. S. While not limited thereto, it will be assumed for purposes of explanation that the frequency modulation is triangular.

The output of the transmitter 10 is fed to an appropriate antenna 11 to beam the same toward the earth. A portion of said output is also fed to an altimeter receiver 12, wherein it is heterodyned with the reflected signal picked up by a receiving antenna 13. The resulting beat note, whose frequency is a function of the travel time of the originally transmitted signal to and from the earth, and is, therefore, an indication of altitude, is applied to an altitude indicator 14, for example, of the cycle-counting type, whose scale is graduated directly in terms of altitude.

During the calibration of the above-described altimeter, the transmitter output is not radiated, and the reflected signal normally applied to the receiver in actual operation is replaced by the synthetic signal developed by the calibrator of the present invention.

Said calibrator comprises a very stable range oscillator 15, which is, preferably, crystal-controlled, and adapted to generate electrical oscillations W, assuming it is desired to calibrate the altimeter at approximately 380 feet, of a frequency of 1300 kc., corresponding to a period of .77 microsecond, which is the time it takes for a radio wave to travel 380 feet to a reflecting object and return, over the same distance, to its point of original transmission, hereinafter referred to as the time-equivalent of an altitude of 380 feet. Once during each cycle of operation, said oscillator develops a sharp pulse across a pulse generator 16, which may take the form of a highly damped inductor which has, in conjunction with its distributed capacitance, a resonant frequency, for example, of approximately 7 mc., corresponding to a period of approximately .05 microsecond. Once excited, such a circuit continues to oscillate at its natural period with diminishing amplitude as indicated at X.

The wave train developed in the generator 16 is applied to a pulse amplifier 17 so designed that only the first positive half-cycle of said wave train is passed thereby, and this, in the form of a sharp negative pulse Y.

The calibration oscillator 18 may comprise a push-pull, tuned-grid, tuned-plate, fixed-frequency generator, using plate and grid lines as the frequency-controlling elements, and operating at a frequency outside of the band of the altimeter transmitter 10, for example, 410 mc.

A quencher 19, in the form of full-wave rectifiers connected across the plate line of the calibration oscillator, is adapted to receive the sharp negative output of the pulse amplifier 17 and become conducting so as to quench the calibration oscillator and absorb therefrom any residual oscillation energy.

Thus, the calibration oscillator 18 has alternate free-running and quenched periods which are precisely controlled as to time duration. A portion of the output of the altimeter transmitter 10 is coupled to the calibration oscillator 18. An oscillatory circuit 19' is also coupled to said calibration oscillator, said oscillatory circuit being resonant to the frequency of said calibration oscillator and, after being energized thereby, continuing to oscillate both during and intermediate the free-running periods of said calibration oscillator. The outputs of the altimeter transmitter and the oscillatory circuit thus combine in the calibration oscillator to produce a resultant input to the latter the instantaneous magnitude of which is a function of the instantaneous phases of said outputs. The magnitude of the resultant wave at the commencement of each free-running period of the calibration oscillator determines the speed with which the oscillations generated by said calibration oscillator build up to their maximum value. It follows, therefore, that each train of oscillations generated by the calibration oscillator will have an average amplitude which is a function of the magnitude of said resultant wave at the commencement of each such train of oscillations.

The output Z of the calibration oscillator is fed to a detector 18' and then to the audio-frequency section of the altimeter receiver 12, and, as will now be described, an audio-frequency note is obtained which simulates that produced under actual operating conditions at the chosen calibrating altitude.

Fundamental to the operation of the calibrator of the present invention are these two facts: (1) that the calibration oscillator does not oscillate continuously, but is periodically quenched at a precisely controlled rate so that it oscillates freely for accurately controlled intervals of time; and (2) that no oscillation energy remains to fix the initial phase of successive periods of operation. The lose coupling between the altimeter transmitter 10, oscillatory circuit 19' and the calibration oscillator 18 initially starts the latter, but once started, the calibration oscillator is not held in synchronism and it breaks away into operation at its own frequency, the oscillatory circuit 19', of course, following it.

In Fig. 2 of the drawings, two complete frequency sweeps $F_1$ of the altimeter transmitter are shown, each sweep cycle consuming $1/120$ second. In this figure, there is also shown the fixed frequency $F_2$ of the calibration oscillator, and a small portion $a$—$a'$ of the bandwidth swept by the altimeter frequency F₁. During said small portion a—a', a certain number of calibration oscillator free-running periods occur, and during each of these free-running periods, a train of oscillations is generated. These are shown, considerably expanded, in the form of oscillation envelopes in Fig. 3b of the drawings.

Now, as previously indicated, the oscillatory circuit 19' continues to oscillate intermediate the free-running periods of the calibration oscillator, and the output of this oscillatory circuit and the altimeter transmitter output combine to produce a resultant wave such as is shown in Fig. 3a. It is the magnitude of this resultant wave at the commencement of each free-running period of the calibration oscillator that determines the average amplitude of the train of oscillations generated during each free-running period.

Fig. 3c shows further expanded a few of the oscillation envelopes A to G, inclusive, of Fig. 3b. Inasmuch as the incremental change in average amplitude per free-running period is so small, only every nth period has been expanded in order to make it possible to show a greater period-to-period change. As in the case of a superregenerative detector, the average amplitude of each free-running period depends upon the speed with which the oscillations generated during each such running-period builds up, and this speed, in turn, depends upon the magnitude of the detector input at the commencement of each such free-running period. In the present invention, the detector input is the resultant wave produced by combining the altimeter transmitter and oscillatory circuit outputs. In Fig. 3c, the dotted horizontal lines within each oscillation envelope represent the average amplitude of each oscillation envelope and it will be noted that in a succession of such envelopes, an average voltage is developed which varies in a cyclic manner at an audio-frequency rate.

The average voltages developed in the selected free-running periods, and shown greatly expanded in Fig. 4, have been plotted closer together in said figure, resulting in a step curve. Obviously, if a more detailed plot of the average voltages contributed by each free-running period during the time interval a—a' were to be made, a smoother curve would result. Such a smoother curve is drawn superimposed on the step curve to present a closer approximation of the audio-frequency cycle as it is actually formed. The resulting signal is amplified and applied to the altimeter altitude indicator to provide the desired calibration at the chosen calibrating altitude.

A complete description has now been given of the manner in which the calibrator of the present invention functions to apply to the altimeter a signal simulating that produced in actual operation at a selected altitude, and there shall now be described one form of circuit which may be utilized to generate said signal.

As shown in Fig. 5 of the drawings, the range oscillator 15 may comprise a pentode vacuum tube 20 the control grid 21 of which is connected, through a crystal 22, shunted by a resistor 23, to a tank circuit comprising series-connected capacitors 24 and 25 shunted by an inductor 26. The junction of said capacitors 24 and 25 is directly returned to the cathode 27 of said tube 20, and the cathode side of the tank circuit is returned to said cathode through the parallel-connected inductor 28 and resistor 29. The screen grid 30 and the plate 31 of the tube 20 are connected to the positive terminal of a suitable source of B voltage (not shown), the negative terminal of said voltage source being returned, through ground and the quench pulse generator 16, to the cathode side of the oscillator tank circuit. Said plate 31 is grounded for R.-F. through a capacitor 32, and the suppressor grid 33 is directly grounded, as shown.

The pulse generator 16 may comprise an inductor 34 shunted by a damping resistor 25, said inductor having such distributed capacitance that the natural resonant frequency of this circuit is high as compared with the frequency of the range oscillator 15. It has been found desirable to connect the pulse generator into the cathode return circuit of the oscillator 15.

The output of the generator 16, consisting of a succession of damped wave trains corresponding to the positive alternations of the oscillator 15, is applied to the pulse amplifier 17. Preferably, the latter comprises a pentode vacuum tube 36 having its cathode 37 grounded through a C-bias source 38, and its control grid 39 connected to the upper junction of the inductor 34 and resistor 35. The screen grid 40 and the plate 41 of the tube 36 may be connected to the B supply through a resistor 42, and the suppressor grid 43 thereof may be grounded, as shown. The C-bias should be of such value that only the first positive pulse applied to the tube 36 is of sufficient amplitude to cause said tube to conduct, thereby resulting in a negative quenching pulse having a repetition rate corresponding to the frequency of the range oscillator 15, and a width corresponding to a half-period of the pulse generator 16.

The amplified quenching pulse is applied, through a coupling capacitor 44, across a resistor 45 which is grounded through a capacitor 46.

The quencher 19 is connected across the resistor 45, and includes a pair of diodes 47 and 48. The cathodes 49 and 50 of said diodes are tied together and connected to the upper end of the resistor 45, and the plates 51 and 52 of said diodes are connected, respectively, to resonant lines 53 and 54 of the calibration oscillator 18, and through a shorting bar 55 across said lines 53 and 54, to the lower end of the resistor 45. The shorting bar 55 is connected, through a resistor 56, to the B supply.

Inasmuch as the diodes are connected across the plate lines of the calibration oscillator 18, the latter becomes quenched whenever said diodes become conducting. Furthermore, any oscillation energy remaining in the calibration oscillator is absorbed by the quenching diodes.

As stated in earlier portions of this specification, the calibration oscillator 18, preferably, comprises a push-pull, tuned-grid, tuned-plate oscillator, and it may include a pair of triode vacuum tubes 57 and 58 having cathodes 59 and 60 grounded, respectively, through a parallel-connected inductor 61 and resistor 62, and a parallel-connected inductor 63 and resistor 64. The grids 65 and 66 of said tubes are tied together by a grid line 67 which is center-tapped and grounded through a resistor 68, and the plates 69 and 70 of said tubes are connected, respectively, to the plate lines 53 and 54.

The tuned circuit 19' may comprise a parallel-connected inductor 71 and capacitor 72 coupled to the grid line 67 of the calibration oscillator 18 through a loop 73.

A portion of the output of the altimeter 10 may be applied to the calibration oscillator 18 through a coupling loop 74 adjacent the grid line 67, and the output of the calibrator as a whole may be similarly applied to the detector 18' through a coupling loop 75.

It will be noted that the resultant wave which controls the average amplitude of the successive trains of oscillations produced by the calibration oscillator 18 is obtained by combining the altimeter transmitter and oscillatory circuit outputs in the grid line 67 of said calibration oscillator.

This completes the description of the aforesaid illustrative embodiment of the present invention.

It will be noted from all of the foregoing that there has been provided a signal generator which is adapted to generate a synthetic signal for calibrating radio altimeters of the frequency-modulated type. It will further be noted that said synthetic signal is a replica of that produced by an actual signal returning from the earth to a given altitude, and that said synthetic signal is generated under such precisely controlled conditions as to assure the reliable calibration of the altimeter.

Other objects and advantages of the present invention will readily occur to those skilled in the art to which the same relates.

What is claimed is:

1. In a signal generator for enabling the calibration of a frequency-modulated, distance-determining radio system: means for recurrently generating a train of electrical oscillations; the period of each such train of oscillations being substantially equal to the time-equivalent of a predetermined distance at which said system is to be calibrated; an oscillatory circuit, resonant to and connected to receive said oscillations, and being adapted to oscillate during and intermediate the period of each such train of oscillations; and means for mixing the output of said oscillatory circuit with the signals generated by said radio system, and conveying the resultant wave to said first-named means to bias the latter, whereby each train of oscillations generated by said first-named means varies in average amplitude as a function of the magnitude of said resultant wave at the commencement of each such train of oscillations.

2. In a signal generator for enabling the calibration of a frequency-modulated, distance-determining radio system: a first oscillator for generating electrical oscillations; a second oscillator the period of whose frequency is substantially equal to the time-equivalent of a predetermined distance at which said system is to be calibrated; means, coupled to and receptive of the output of said second oscillator and also coupled to said first oscillator, for recurrently quenching said oscillations, whereby each free-running period thereof is substantially equal to said time-equivalent of said predetermined distance; an oscillatory circuit, resonant to and connected to receive said oscillations, and being adapted to oscillate during and intermediate the free-running periods thereof; and means for mixing the output of said oscillatory circuit with the signals generated by said radio system, and conveying the resultant wave to said first-named oscillator to bias the latter, whereby the oscillations generated during each free-running period of said first-named oscillator vary in average amplitude as a function of the magnitude of said resultant wave at the commencement of each such free-running period.

3. In a signal generator for enabling the calibration of a frequency-modulated, distance-determining radio system; means for recurrently generating a train of electrical oscillations; the period of each such train of oscillations being substantially equal to the time-equivalent of a predetermined distance at which said system is to be calibrated; an oscillatory circuit, resonant to and connected to receive said oscillations, and being adapted to oscillate during and intermediate the period of each such train of oscillations; means for mixing the output of said oscillatory circuit with the signals generated by said radio system, and conveying the resultant wave to said first-named means to bias the latter, whereby each train of oscillations generated by said first-named means varies in average amplitude as a function of the magnitude of said resultant wave at the commencement of each such train of oscillations; and means, connected to said first-named means, for demodulating said oscillations to extract therefrom an average voltage varying in magnitude at a frequency corresponding to that obtained during normal system operation at said predetermined distance.

4. In a signal generator for enabling the calibration of a frequency-modulated, distance-determining radio system: a first oscillator for generating electrical oscillations; a second oscillator the period of whose frequency is substantially equal to the time-equivalent of a predetermined distance at which said system is to be calibrated; means, coupled to and receptive of the output of said second oscillator and also coupled to said first oscillator, for recurrently quenching said oscillations, whereby each free-running period thereof is substantially equal to said time-equivalent of said predetermined distance; an oscillatory circuit, resonant to and connected to receive said oscillations, and being adapted to oscillate during and intermediate the free-running periods thereof; means for mixing the output of said oscillatory circuit with the signals generated by said radio system, and conveying the resultant wave to said first-named oscillator to bias the latter, whereby the oscillations generated during each free-running period of said first-named oscillator vary in average amplitude as a function of the magnitude of said resultant wave at the commencement of each such free-running period; and means, connected to said first-named oscillator, for demodulating said oscillations to extract therefrom an average voltage varying in magnitude at a frequency corresponding to that obtained during normal system operation at said predetermined distance.

ROYDEN C. SANDERS, JR.
WILLIAM R. MERCER.

REFERENCES CITED

The following references are of record in the file of this patent:

UNITED STATES PATENTS

| Number | Name | Date |
|---|---|---|
| 2,218,923 | Newhouse | Oct. 22, 1940 |
| 2,420,211 | Tourshou | May 6, 1947 |
| 2,421,016 | Deloraine et al. | May 27, 1947 |
| 2,425,600 | Coykendall | Aug. 12, 1947 |
| 2,455,996 | Harvey | Dec. 15, 1948 |